United States Patent [19]
Ledet

[11] Patent Number: 5,353,695
[45] Date of Patent: Oct. 11, 1994

[54] SELF-EXPANDING GASKET

[75] Inventor: Brent A. Ledet, Metairie, La.

[73] Assignee: The Laitram Corporation, Harahan, La.

[21] Appl. No.: 14,713

[22] Filed: Feb. 8, 1993

Related U.S. Application Data

[63] Continuation-in-part of Ser. No. 887,832, May 26, 1992, Pat. No. 5,184,538.

[51] Int. Cl.$^5$ .............. A23L 3/00; A23N 12/00; A47J 27/16
[52] U.S. Cl. .............. 99/443 C; 49/477.1; 99/477; 277/34; 277/201
[58] Field of Search ........... 99/325, 467, 443 C, 99/477; 277/201, 226, 34, 34.3; 49/477.1, 498.1; 126/273 R, 190, 198

[56] References Cited

U.S. PATENT DOCUMENTS

| | | | |
|---|---|---|---|
| 1,992,398 | 2/1935 | Ryder . | |
| 2,607,966 | 8/1952 | Beck | 277/226 |
| 3,007,600 | 11/1961 | Horner | 277/226 |
| 3,352,446 | 11/1967 | Anderson et al. | 49/477.1 |
| 3,501,868 | 3/1970 | Ganizinotti | 277/34.3 |
| 3,812,316 | 5/1974 | Milburn | 49/498.1 |
| 3,952,454 | 4/1976 | Sudo | 49/498.1 |
| 4,129,307 | 12/1978 | Nishiura et al. | 277/226 |
| 4,177,353 | 12/1979 | McCormack | 49/477.1 |
| 4,228,135 | 10/1980 | Wolff | 49/477.1 |
| 4,335,075 | 6/1982 | Kackos | 49/477.1 |
| 4,509,412 | 4/1985 | Whittenburg et al. . | |
| 4,862,794 | 10/1989 | Lapeyre et al. . | |
| 4,887,524 | 12/1989 | Ellis-Brown . | |
| 4,937,090 | 6/1990 | Bichel . | |
| 5,001,866 | 3/1991 | Powell et al. | 49/477.1 |
| 5,072,663 | 12/1991 | Ellis-Brown . | |

FOREIGN PATENT DOCUMENTS

774929  5/1957  United Kingdom ........ 277/226

Primary Examiner—Timothy F. Simone
Attorney, Agent, or Firm—James T. Cronvich

[57] ABSTRACT

A self-sealing door for a steam cooker using a self-expanding resilient tubular gasket to form a seal between the inner side of the door and the sidewall of the cooker. Access to the cooking chamber is provided through a plurality of access ports in the sidewalls of the cooker. Hinged doors cover the access ports during cooking. The gasket is pressed slightly against the wall of the cooker around the access port by the pressure of the closed door. The high cooking temperature of the chamber transfers heat to the gasket, which causes air trapped within the tubular gasket to expand, thereby forming a seal between the inner side of the closed door and the outside wall of the cooking chamber tight enough to prevent the escape of useful steam. The gasket is strapped loosely in place along guides extending from the inner side of the door for easy cleaning and replacement.

10 Claims, 6 Drawing Sheets

SELF-EXPANDING GASKET

This application is a continuation-in-part of my copending application Ser. No. 07/887,832, filed May 26, 1992, for HIGH EFFICIENCY STEAM COOKER, now U.S. Pat. No. 5,184,53, issued Feb. 9, 1993.

TECHNICAL FIELD

This invention relates generally to seals and, more particularly, to self-expanding gaskets that are self-inflatable at elevated temperatures and useful in sealing the doors of cookers.

BACKGROUND ART

Steam cookers through which conveyor belts carry food products are well known. For example, skins are loosened on tomatoes carried on a conveyor belt in Ryder, U.S. Pat. No. 1,992,398, Feb. 26, 1935 by maintaining a cooking zone of superheated steam at above atmospheric pressure. There is no attempt to efficiently cook the entire product, nor to produce an efficient cooker. Thus, the hot steam at high pressure is used to purge air out of the cooking zone and thus the steam energy is inefficiently used for cooking the food.

Vegetables are steam cooked by vaporized water over a body of boiling water in Bichel, U.S. Pat. No. 4,937,090, Jun. 26, 1990. The lower cooking temperatures, criticality in temperature and product controls, and inefficiency of heat exchange between the product and heating medium encompass a long cooking time and prevents uniformity and efficiency of cooking from the energy source that heats the water tank.

Ellis-Brown, U.S. Pat. No. 5,072,663, Dec. 17, 1991 specially teaches a cooker for shrimp with steam flowing at a pressure higher than atmospheric through a cooking zone containing a conveyor belt. Input cooking steam is mixed with air carried into the compartment by the belt, and vapors released by the cooking shrimp before reaching the shrimp cooking region, so that the input steam energy is not concentrated and spent solely upon the shrimp being cooked. Furthermore, uniform cooking conditions are difficult to obtain because of dependency upon variable air temperature and humidity, for example. Also, hotter steam migrating to the top of the compartment is discharged out of the top of the cooker to further decrease cooking efficiency. The incoming steam pressure keeps the compartment above atmospheric pressure, thus further tending to force the hot steam out into the atmosphere. Since an attempt is made to conserve minor energy losses through cabinet walls with specially formed insulation of stainless steel housing, it is clear that a more efficient system was not recognized.

A previous development is a saturated steam cooker in the George C. Lapeyre et al. U.S. Pat. No. 4,862,794, Sep. 5, 1989 for APPARATUS FOR CONTROLLING PRECOOKING AND MACHINE PEELING SHRIMP. This cooker carries shrimp on a conveyor into a shallow inverted open bottom box into which is continuously fed saturated steam near the closed top panel where it remains until condensation descends into the atmosphere through the open bottom as it cools from the cooking of shrimp on the conveyor belt by saturated steam at the constant temperature of 212° F. Thus, as long as the saturated steam is replenished as needed to replace cooking energy for the amount of shrimp cooked in its presence, the cooking temperature remains constant. There is a significant advantage in keeping air and vapors from the saturated steam by the flow of fresh saturated steam into the cooking region.

This prior art cooker works well, but has been found to have operational deficiencies which are resolved by the present improved cooker. For example, the shallow open bottom box structure permits the escape of enough hot steam to reduce cooking efficiency. Also, a shallow open bottom container for confining saturated steam permits entry of contaminants such as air or internal vapors in response to external and internal air flow paths. For example, if in the vicinity of cross winds from an open window or heater duct in a plant, the retention of uncontaminated saturated steam in the cooking region necessary for cooking efficiency and repeatable cooking quality control is not feasible.

Furthermore, the cooking of various sizes of shrimp at differing input temperatures and moisture content, etc., when carrying various loading densities of raw shrimp in industrial quantities on a movable conveyor belt through the cooker imposes a wide range of cooking conditions. The prior art cookers could not handle efficiently such wide ranges of conditions encountered in practice with efficient cooking methods at high volume industrial capacity where cooking speeds must be high without deterioration of consistent product quality under simple and effective automatic control conditions. For example, the shallow height of the cooking chamber in the Lapeyre et al. cooker makes it difficult to maintain control under varying thermal product loads.

Thus this invention has as an objective the improvement of the state of the art by providing an improved automatically controlled cooking chamber with internal pressure substantially atmospheric that prevents dilution or variation of the 212° F. cooking energy of saturated steam surrounding the product being cooked.

Further, it is a general objective of the present invention to provide more efficient and uniform cooking methods and equipment adapted to higher volume, higher speed industrial use.

In many cooking applications, it is important that easy access to the cooking chamber be provided so that functions such as inspection and cleaning can be performed. None of the aforementioned cookers shows access doors. U.S. Pat. No. 4,887,524, also to Ellis-Brown, shows a cooker having access doors to the cooking chamber, but no details on the sealing of the doors. The conventional way of sealing doors is through the use of a rubber or foam-rubber gasket glued in place around the opening covered by the door. When the door is closed, it compresses the gasket, making a seal preventing the escape of steam and water vapor. With time, however, gaskets tend to dry out and lose their resiliency. The typical approach used with a compression gasket is to tighten the door against the gasket even more, but this accelerates the breakdown of the gasket material. When this happens, the seal is broken and useful steam can escape, diminishing cooking efficiency. Frequent gasket replacement is necessary. Furthermore, the glue can lose its hold, forming hard-to-clean crevices or gaps between the underside of the gasket and the door. Hollow gaskets that can be inflated by an external source of air pressure are used to overcome the shortcomings inherent in foam rubber gaskets. These actively inflated gaskets, however, require often unwieldy auxiliary equipment, such as valves, pipes, and pumps. Consequently, a further object is to provide a simple, inexpensive way to minimize adjustment and replacement of gaskets sealing access ports to cookers.

DISCLOSURE OF THE INVENTION

Improvements in the control and efficiency of cooking in industrial cookers carrying products through a steam cooking chamber on a conveyor belt are afforded by this invention. To obtain significantly improved efficiency from a saturated steam energy source for cooking shrimp and other food products, such as chicken strips, vegetables, and other shellfish, a substantially enclosed cooking chamber having an internal pressure substantially atmospheric employs saturated steam at substantially 212° F. into which the products to be cooked are immersed. Provisions are made for constant temperature cooking with good cooking energy transfer efficiency from pure saturated steam, and for simple effective controls to replenish fresh saturated steam at a rate proportional to the cooking energy expended in the product. (Hereinafter, all references to cooking temperatures of 212° F. imply an ambient condition of standard atmospheric pressure. For other ambient pressures, the cooking temperature is the corresponding boiling temperature of water.)

A cooking region is provided for confining by gravity saturated steam which rises and remains in the upper zone of a closed compartment member. The saturated steam is introduced into the cooking region at a predetermined rate to replace condensed steam and permit that condensate to drop out of the cooking region. The saturated steam flow rate is controlled to maintain a constant temperature of less than 212° F. at a position in a lower zone of the cooking region typically being between about 190° and 200° F., to thus automate simply the cooking process for high cooking efficiency from the input steam, which thus is more efficient than conventional prior art systems that permit input steam to be mixed with air and vapors throughout the cooking region.

The food products are cooked by introducing them into the constant 212° F. cooking region for a predetermined time, established by the speed of the conveyor belt through the cooking region. A plastic conveyor belt conserves loss of steam energy usually expended in heating a metal belt. The constant cooking temperature keeps automated controls simple and effective in reproducing cooking conditions for uniform quality control. By controlling the flow of steam, vapor, and air within the cooking chamber to prevent dilution of saturated steam in the cooking region, variations of temperature, cooked food quality, and uniformity and cooking inefficiencies are eliminated, as well as the danger of oxidation from air contamination. Energy losses from discharge of hotter steam are eliminated, and efficiencies are improved by the efficient heat transfer interface between saturated steam and the product to the exclusion of insulating air or vapors which absorb and waste heat energy.

In particular it is recognized that a cooking region of considerable height is required for maintaining in the cooking region substantially static flow conditions restricted to the downward movement by gravity condensate formed by the transfer of heat energy into the product and the corresponding replenishment of condensed steam with fresh saturated steam. Thus, any flow paths from extraneous air or vapors must be eliminated to maintain quality and efficiency. Protective sidewalls adjacent the cooking region define a deep chamber providing a greater thermal capacity of saturated steam in the upper zone of the chamber, thereby simplifying thermal control. Substantially closed outer chamber walls insure elimination of substantially all contaminating air and vapors from the upper zone.

Access to the cooking chamber is through a plurality of access ports in the sidewalls of the cooking chamber. Hinged doors cover the access ports during cooking. A closed resilient tubular gasket is pressed slightly against the outside of the cooking chamber around the access port by the closed door. The temperature of the chamber causes the air within the tubular gasket to expand, forming a seal between the inner side of the closed door and the outside of the cooking chamber tight enough to prevent the escape of useful steam through the access port.

Further objects, features and advantages of the invention will be found throughout the following description, drawings and appended claims.

BRIEF DESCRIPTION OF THE DRAWINGS

In the accompanying drawings, wherein like reference characters refer to similar features throughout the several views to facilitate comparison.

THE PREFERRED EMBODIMENT

Figure 1:
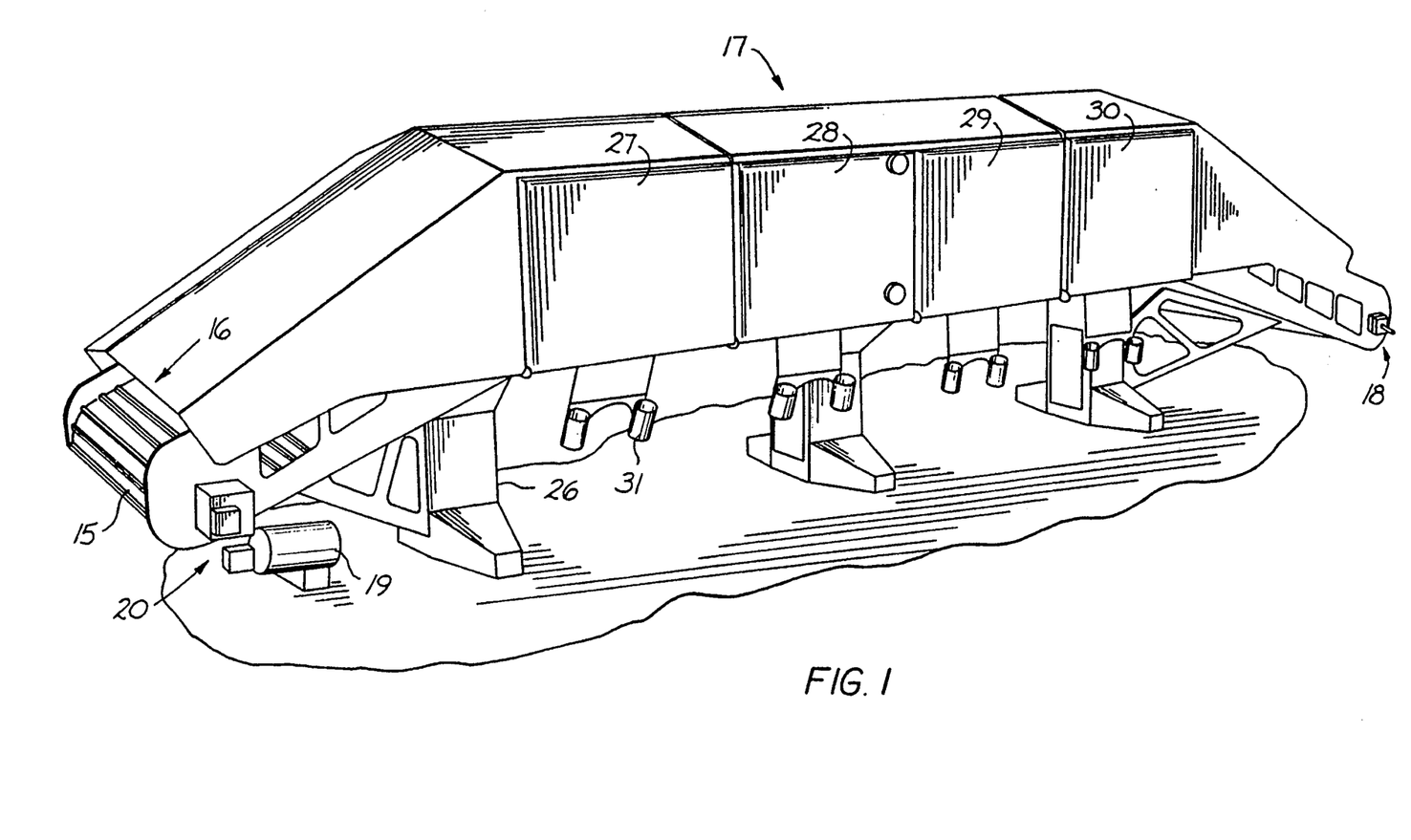
FIG. 1 is a perspective view of a steam cooker embodiment of the invention with a conveyor belt for transporting a product to be cooked, such as shrimp, through the cooker at a controlled belt speed.

Now with reference to the accompanying drawing, the features and operation characteristics of the invention will be described in more detail. As seen from FIG. 1, a product to be cooked, such as shrimp, is loaded on a conveyor belt 15 at the entrance port 16 for conveyance through the cooker cabinet 17 toward the output port 18. Preferably the endless conveyor belt 15 is plastic for reducing heat losses from the cooker through radiation from a heated metal belt. A belt drive motor 19 and belt speed control system 20 are provided for varying the dwell time of the product on the belt in the cooker, as a cooking control feature. Thus, as required for cooking different products or handling different product loading densities on the belt, a desired cooking time can be established. Support legs 26 are provided with leveling adjustments. Doors 27 to 30 are moved downwardly against brackets 31 for easy access to the inside of the cooker.

Figure 2:
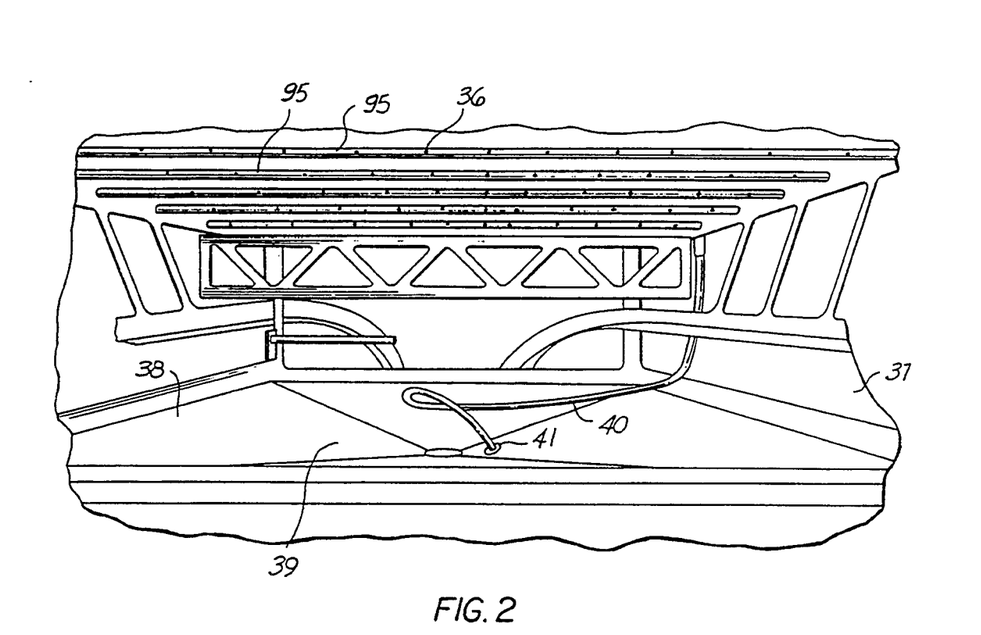
FIG. 2 is a cutaway view, without the conveyor belt in place, looking into the interior of the cooker cooking region toward the conveyor belt entrance port, showing a set of steam inlet pipes and ports, and a lower panel with condensation outlet port.

A lower part of the internal cooking region is seen in FIG. 2 looking toward the belt inlet port 16 without the conveyor belt in place. Disposed in the upper cooking zone is an interconnected manifold or set of steam inlet pipes 95 dispersed along the heating chamber for introducing saturated steam at 212° F. The multiple outlet holes or slits 36 in steam pipes 95 are directed laterally substantially in a plane parallel to the belt (not shown) which would ride directly above the steam inlet manifold pipes 95. Thus, any product residue would not tend to drop into and clog the holes 36. It is important to realize in connection with this invention that the saturated steam is about half the density of air, and that the cooking region is maintained at nearly atmospheric pressure, so that the saturated steam rises in the cooking chamber to its upper limit defined by the top panel structure of the cooker 17, thus surrounding the products to be cooked on the belt.

As later set forth in more detail, the saturated steam is introduced at a rate that ensures a saturated steam atmosphere surrounding the belt in the upper zone of the cooking region. As the steam cooking energy is exchanged with the products being cooked, the steam changes phase to liquid condensate (mist and droplets) and drops by gravity to the bottom of the cooking chamber. The belt return path is through the cooking chamber to assure that heat losses from radiation to a cooler environment are reduced, thus contributing to greater cooking efficiency provided by the cooker system of this invention.

Precaution is taken that external flow of air or vapor is kept out of the cooking region by the sidewalls 37 and bottom closure plate 38, thereby to retain a substantially static layer of saturated steam in the cooking region. The saturated steam layer extends downward from the top of the chamber to at least the level of the product on the belt. Below the steam layer is a layer comprising condensate cooler than the saturated steam. Condensate dripped from the product is accumulated by the funnel-like contour of the bottom plate 38 and funneled into the condensate discharge line 39. Steam inlet line 40 is introduced through an opening plate 41 in the bottom plate 38. The critical depth of the sidewalls 37 minimizes the loss of saturated steam through the belt outlet port 16 and outlet port 16'. The inlet steam rate thus is to be controlled in the manner later discussed to substantially equally replace the condensed saturated steam.

Figure 3:
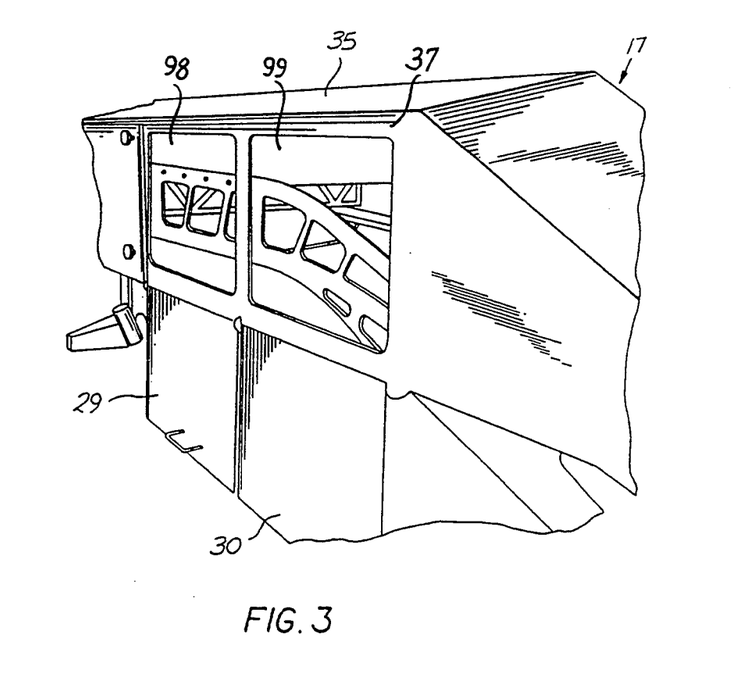
FIG. 3 is a perspective fragmental view showing the interior cooking region and conveyor belt support framework with open side access doors.

In FIG. 3, the access doors 29, 30 are moved downwardly to show the interior cooking chamber with the belt removed. The upper panels 35 enclose the cooking region to confine the saturated steam and limit its upward flow to the chamber, as inferred at the top 35' of the graph of FIG. 4. This graph defines a product level 45, a transition region 46, comprising a mixture of cooler and heavier air and condensed water vapor, as seen from the temperature graph line 47, and a thermostat sensor level 48, as well as the bottom enclosure level 38'. Above the transition region in the upper zone of the cooking region, the saturated steam is at its 212° F. temperature, and the product is in essence immersed into the saturated steam for cooking at product level 45 to be fully surrounded by saturated steam free of insulating air, thereby assuring efficient transfer of the steam energy to the product for fast, efficient cooking.

Since the cooking temperature is always at a constant 212° F., simply regulating cooking time in the cooking region ensures a consistent quality of output cooked product. Thus, simply controlling belt speed will control the product dwell time and the amount of cooking of the product, without attention to any other variable.

Figure 4:
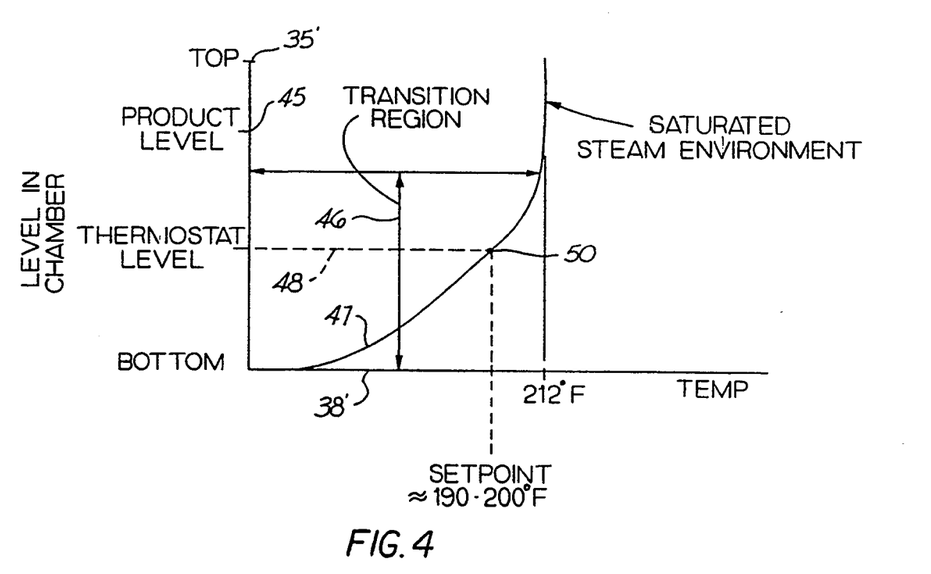
FIG. 4 is a graphical chart illustrating the saturated steam behavior in the cooking region, which contributes to efficient cooking and simple regulation of cooking conditions for repeatable quality control with various product characteristics and loading conditions.

Also the steam input control of this system is simple, because of the critical deep compartment relationship between the protected upper and lower zones of the cooking region that maintain the stratification of the pure saturated steam in the upper zone and the lower temperature condensate in the lower zone. Thus, a thermostat sensor 50 positioned at a predetermined height in a stable region of the lower temperature zone operates a proportional release of only enough fresh saturated steam to keep the temperature at the sensor, typically 190°-200° F., constant. This ensures maintenance of the 212° F. cooking temperature in the upper region and fast reliable variable adjustment of steam input to fit the needs and conditions of operation. For example, if there is a gap in the product on the conveyor belt, the system runs effectively with very little new steam but is ready immediately to operate at full load when the product appears and condenses the saturated steam in the upper zone to tend to lower the temperature at the sensor by the rising of the bottom level of the pure saturated steam layer. Adjustments are made in both directions automatically with very simple controls to keep the system running at top efficiency. For example, a commercially available self operating variable proportional steam valve with sensor is available from H. O. Trerice Co. in Detroit, Mich. for various pipe sizes under the "Trerice Series No. 91000" brand of temperature regulators.

Figure 5:
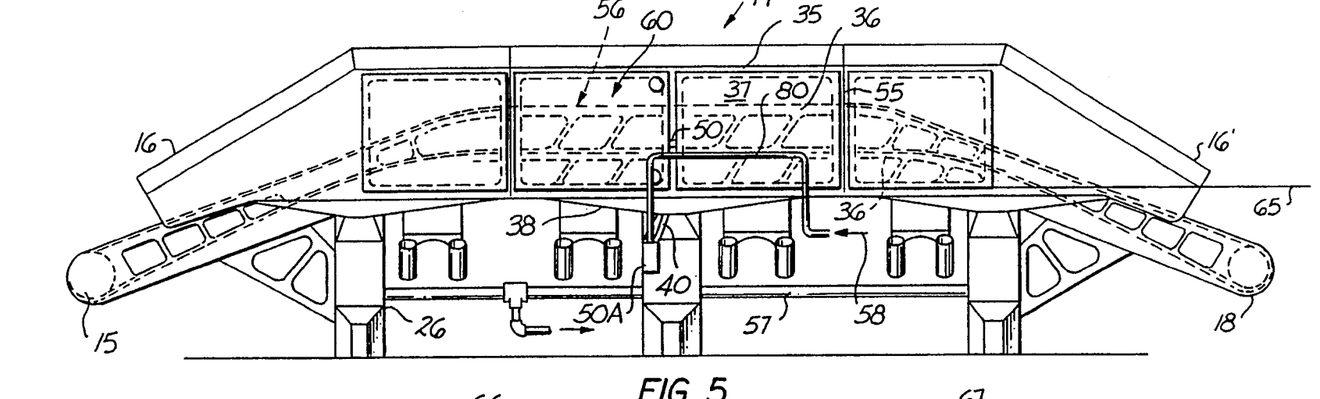
FIG. 5 is a side view sketch of a cooking conveyor embodiment of the invention showing modular construction and control system features.

The foregoing relationship is also configured in FIG. 5 with the conveyor-cooker 17 and conveyor belt 15 support system shown in side view phantom with access doors open. Note that a cooker module 55 is inserted between input port section 16 and output port section 18 of the conveyor 15 transport arrangement, as seen behind the two open doors disposed along a flat length 56 of the conveyor support bracing. Thus the closed bottom pan 38 leads into condensate drainage conduit 57 and passes steam line 40 which receives steam from a high pressure steam conduit 80 routed through the bottom pan 38 to an unshown source at lead 58 and supplying steam to the control valve 50A through the bottom pan 38. Enclosing the high pressure steam conduit within the cooking chamber increases the efficiency of the cooker and eliminates the need for insulating the conduit within the chamber. A thermostatic sensor 50 is positioned substantially in the lower zone center 59 of module 55. The thermostatic regulator and control valve 50A is set to maintain a constant temperature at sensor 50, typically 190° F.

The product rides on belt 15 through the upper region 60 in the saturated steam atmosphere, supplied by manifold discharge nozzles 36. Note the level 65 of the inlet and outlet ports for the conveyor belt, open to the atmosphere to keep the pressure within the cooking chambers substantially at the desired and critical atmospheric pressure level. Also it is critical that air is heavier than the hot steam and thus does not tend to rise for conveyance into the higher level cooking chamber, except for the trivial amount that is carried by friction with the conveyor belt and product upwards into the very much lighter saturated steam atmosphere to rapidly descend by force of gravity and keep the substantially pure saturated steam in the cooking region. Prior art systems have generally not so effectively controlled and eliminated undesirable air, vapor, and contaminant flow paths within a steam cooker, and thus could not provide the cooking efficiency and quality control with simplified control systems that this system symbiotically produces.

Figure 6:
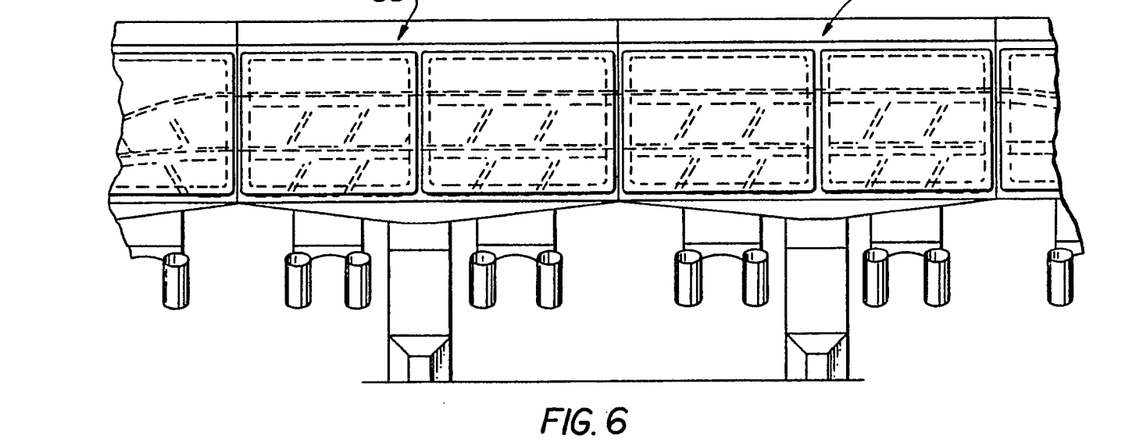
FIG. 6 is a side view sketch of a further modularized high capacity industrial cooking conveyor embodiment for higher volume and cooking speed capacity.

As seen from FIG. 6, two series modular cooking sections 66, 67 are provided along the conveyor belt, each having similar temperature controls as shown in FIG. 5. Thus, the product is cooler in section 66 than in section 67, and the saturated steam released in each compartment is substantially only that necessary to replenish cooking energy needed from the saturated steam. With the two cooking sections 66, 67, the range of throughput quantity of cooked product per unit time, for example, is increased for industrial cooking purposes. Thus, a longer dwell time is available with the longer belt travel distance through saturated steam, which provides more cooking energy so that the belt speed may be increased for more product throughput. One of the modules could be replaced or supplemented by a washing or browning module if desired.

Figure 7:
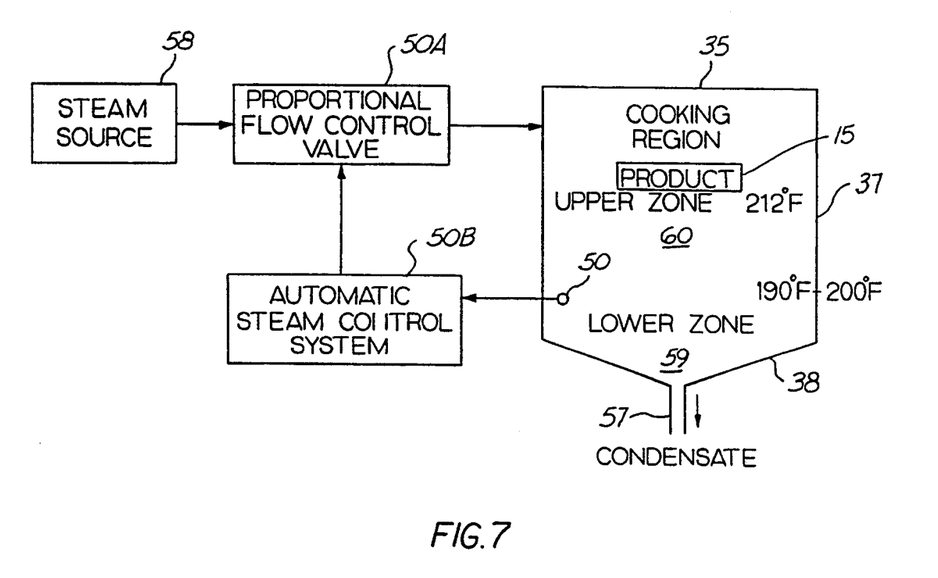
FIG. 7 is a system block diagram illustrating cooker and control system features afforded by this invention.

In FIG. 7, the relationship of the steam input control system to the cooking region structure afforded by this invention is set out in block diagram format. Incoming steam from source 58 is proportionately controlled by valve 50A to decrease or increase and keep the 190°-200° F. temperature at thermostat sensor 50 in the lower cooking region zone stable, by means of the automatic control system 50B that adjusts valve 50A in response to sensed temperature at sensor 50. This maintains the saturated steam atmosphere in the upper zone 60 of the cooking region and about the product on conveyor belt 15, and permits the condensate to drop toward outlet channel 57 substantially solely by force of gravity since only substantially that steam is being replaced that is condensed in cooking the product. Thus, this system corrects the significant deficiency of prior art devices that force hot steam into and out of a cooking chamber and lose energy that should have gone into cooking the product.

Figure 8:
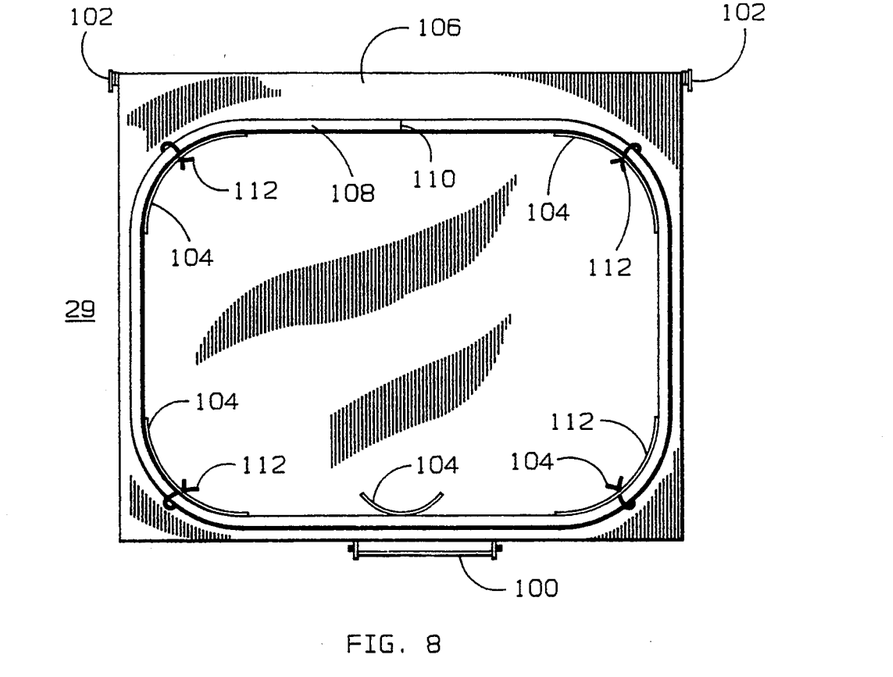
FIG. 8 is a plan view of the inner side of the self-sealing door and gasket of the invention with the door in an open, suspended state.
Figure 9:
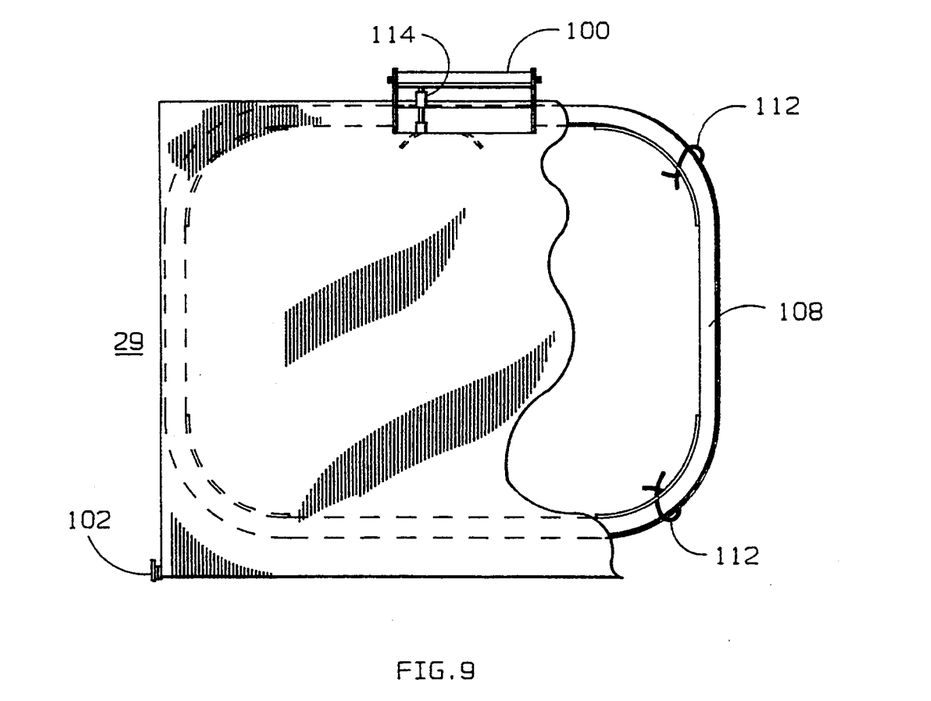
FIG. 9 is a partial fragmentary plan view of the outer side of the door of the invention in a closed state.

As shown in FIG. 3, access to the cooking chamber is provided by access ports 98, 99 in the sidewalls 37 of the cooker. Bottom-hinged doors 29, 30 cover the access ports 98, 99 during cooking. As shown in FIG. 8 and FIG. 9, the door 29 includes a handle 10 with a latch mechanism 114 and hinge parts 102 forming a door hinge with the cooker. Metal guides 104, extending from the inner side 106 of the door 29, are welded in place. A gasket 108, comprising an endless, hollow tube is stretched slightly around the guides 104. The gasket is made of a resilient, essentially non-porous tube of synthetic rubber, such as polyurethane or neoprene, the ends of the tube heated and melted or vulcanized together to form an endless, sealed hoop 108, having a seam 110 where fused together. A gaseous mixture, typically air, is entrapped in the interior of the gasket 108 when it is formed. The air usually contains evaporated or condensed water. Retaining straps 112 looped around the gasket 108 and through holes in the guides 104 retain the gasket loosely in place on the inner side 106 of the door 29. The loosely held gasket 108 is easy to clean and replace. There are no hard-to-reach crevices capable of retaining contaminants, unwanted in food processing applications.

Figure 10:
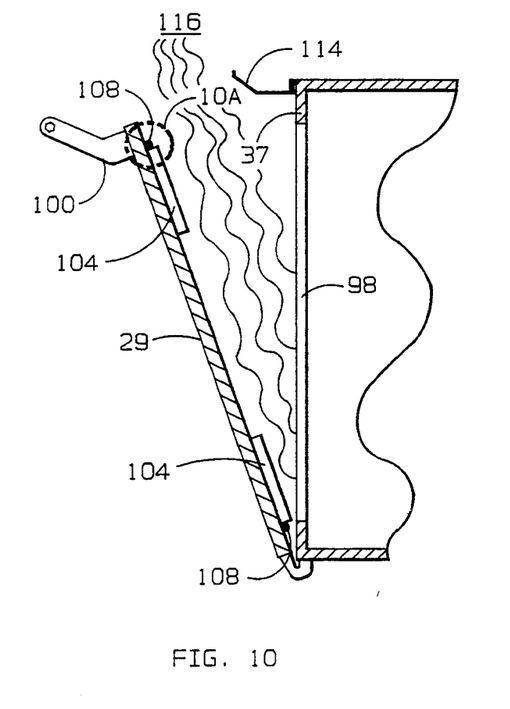
FIG. 10 is a fragmentary side view of a portion of the cooker of the invention with the access door partly open and a blow-up of the gasket in a collapsed state.
Figure 10A:
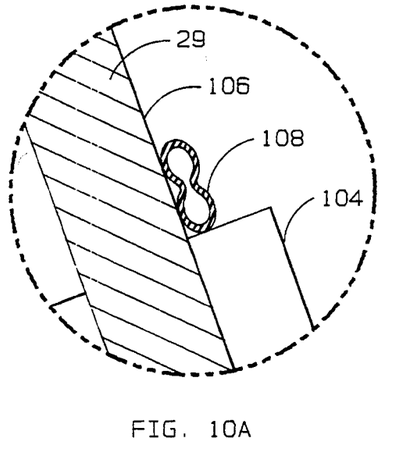

As shown in FIG. 10, the hollow gasket 108, stretched around the guides 104, is effectively collapsed whenever the temperature of the gasket is at a temperature significantly below the cooking temperature 212° F., as is the case whenever the door is open or the cooker is not operating. In fact, at room temperature the pressure of the air inside the gasket 108 is about 1 atmosphere, which is not high enough to prevent the gasket from collapsing on its own. Because the gasket 108 is collapsed, the door is easy to close, there being no extra closing force needed to compress the gasket as would be the case for a foam rubber gasket.

Figure 11:
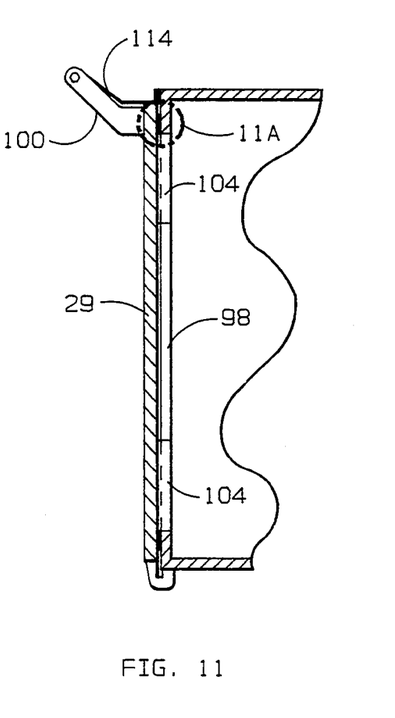
FIG. 11 is a fragmentary side view as in FIG. 10, except with the door closed and the gasket expanded and forming a seal preventing the escape of steam through the access port.
Figure 11A:
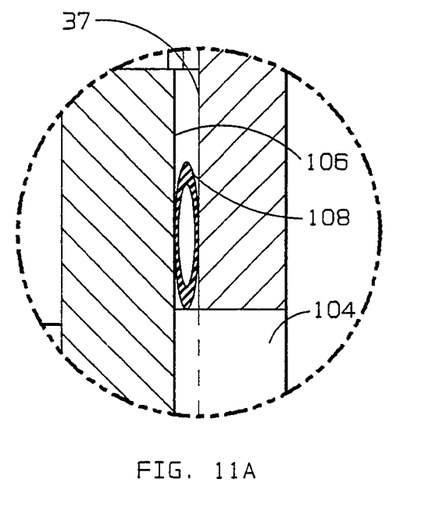

As shown in FIG. 11, with the door 29 closed and held in place by the engagement of the latch mechanism of the handle 100 and the latch flange 114 extending from the cooker sidewall 37, the gasket 108 fits between the inner side 106 of the door and the sidewall 37 of the cooker. The gasket guides 104 match the shape of the access port 98 and fit just inside its periphery when the door is closed. The guides 104 prevent the gasket 108 from slipping into the access port 98. As the cooker is brought up to cooking temperature (212° F.), heat is transferred to the gasket 108, raising its temperature and, thereby, increasing the pressure of the air trapped in the gasket tube. As the pressure inside the tube increases, the gasket 108 expands in the space between the sidewall 37 and the inner side 106 of the door 29 to form a seal preventing useful steam 116 from escaping the cooking chamber. At cooking temperatures, the air pressure within the gasket is about 1.5 to 2 atmospheres. Thus, the self-expanding gasket 108 provides a self-sealing cooker door without the paraphernalia required by actively inflatable gaskets and much easier to clean and replace than foam rubber gaskets. The self-sealing door provides ready access to the cooking chamber to perform standard maintenance and inspection without sacrificing cooking efficiency through poor seals.

It should therefore be evident that this invention has improved the state of the art and has unobviously changed cooking conditions in a longstanding art to provide a more efficient cooking method that can be consistently quality controlled with simple equipment than has heretofore been feasible. Accordingly those unique features and combinational reactions that signify the nature and spirit of this invention are defined with particularity in the following claims.

What is claimed as the invention is:

1. A self-expanding gasket for forming a seal between a first surface having an opening therethrough and a second surface covering the opening, said self-expanding gasket comprising an endless tube positioned between the first surface and the second surface and surrounding the opening, a gaseous mixture entrapped within said endless tube, said gaseous mixture exhibiting a pressure increase with temperature from a low-temperature pressure to a greater high-temperature pressure, said gaseous mixture expanding against said tube and said tube expanding against said to form a seal between the first surface and the second surface by the self-expanding gasket at a high temperature.

2. The self-expanding gasket of claim 1, wherein said gaseous mixture entrapped within said endless tube exhibits a low-temperature pressure of near atmospheric at room temperature and a high-temperature pressure of between about 1.5 and 2 atmospheres at about 212° F.

3. The self-expanding gasket of claim 1, wherein said gaseous mixture encapsulated within said endless tube comprises an air/water mixture.

4. The self-expanding gasket of claim 1, wherein said endless tube comprises a resilient hoop.

5. The self-expanding gasket of claim 1, wherein said endless tube is made of a synthetic rubber.

6. An expandible gasket for forming a seal between a first surface having an opening therethrough into a heated chamber and a second surface covering the opening, said expandible gasket comprising a closed resilient tube positioned between the first surface and the second surface, a gaseous mixture encapsulated within said closed resilient tube, the pressure of said gaseous mixture increasing as said tube is heated by heat transfer from the heated chamber, said gaseous mixture expanding against said tube and said tube expanding against said surfaces to form a tight seal between the first surface and the second surface by said gasket.

7. The expandible gasket of claim 6, wherein said gaseous mixture encapsulated within said closed resilient tube comprises an air/water mixture.

8. The expandible gasket of claim 6, wherein said closed resilient tube comprises an endless loop surrounding the opening in the first surface.

9. The expandible gasket of claim 6, wherein said gaseous mixture inflates said closed resilient tube with a pressure of between about 1.5 and 2 atmospheres at about 212° F.

10. The expandible gasket of claim 6, wherein said closed resilient tube is made of a synthetic rubber.

* * * * *